FIG. 1
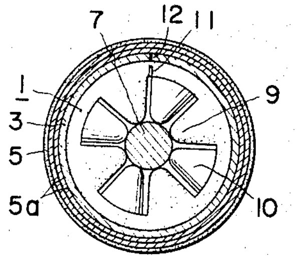
FIG. 2
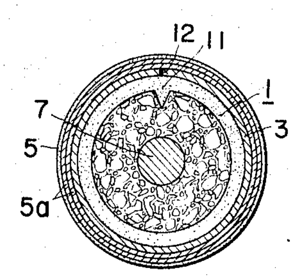
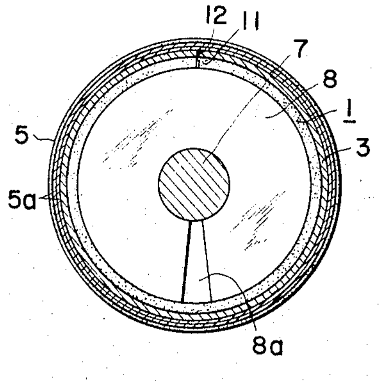
FIG. 3
FIG. 4(A) FIG. 4(B)
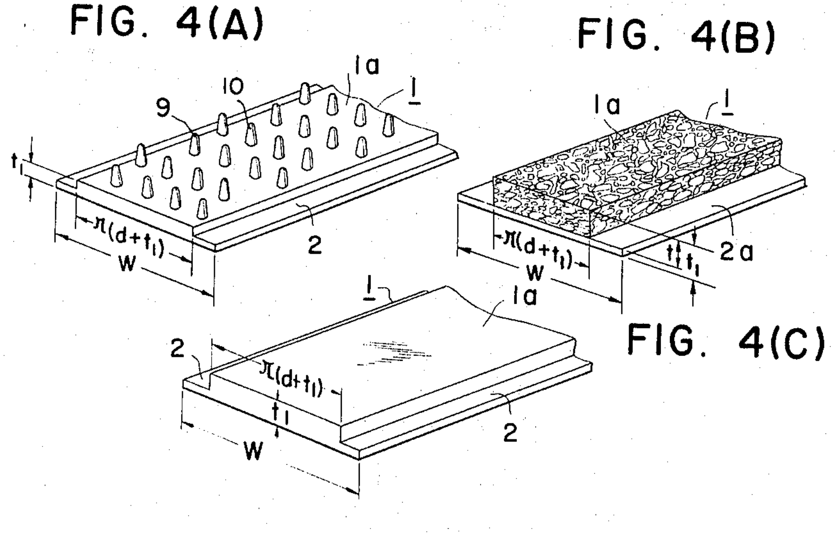
FIG. 4(C)
INVENTOR.
Akira Nago
BY George B. Oujevolk
Attorney INVENTOR.
Akira Nago
BY
George B. Oujevolk
Attorney United States Patent Office 3,341,385

Patented Sept. 12, 1967

3,341,385

METHOD FOR PRODUCING COAXIAL CABLE

Akira Nago, Suginami-ku, Tokyo-to, Japan, assignor to Tujikura Densen Kabushiki Kaisha, Tokyo-to, Japan, a joint-stock company of Japan Filed Feb. 3, 1964, Ser. No. 342,056
Claims priority, application Japan, Feb. 2, 1963, 38/5,182
7 Claims. (Cl. 156—54)

The present invention relates to a method of manufacturing a coaxial cable and to coaxial cable manufactured by said method. The method of the present invention is characterized by that a thin film of plastic tape having on both side edges thereof fusion allowances which are thinner than the tape main portion but will become almost the same thickness as that of said tape main portion after heat fusion is fed longitudinally below a required spacer insulating portion of the inner conductive core, while a metallic tape is fed longitudinally below the said thin film of plastic tape, the assembled materials are then fed into a heat forming device, thereby rendering the said plastic tape to nearly a melted state and bonding the tape main portion with fusion allowances on both side edges being directed toward outside, whereby said both fusion allowances are molded by fusion, simultaneously butt contacting the longitudinal run of the metallic tape also, thereby intimately covering the plastic tape, and then retaining binding tapes, for example, shielding tape or insulation tape are provided on the periphery of the metallic cover after the assembly comes out of the heat forming device.

According to a conventional practice, a coaxial cable of spacer insulating type, especially that of disk type is fitted with insulating disks made of polyethylene with a certain constant spacing therebetween on the inner conductor, the positions of said disks being fixed by the outer conductor (a copper tape) provided longitudinally thereupon and the inner conductor. Therefore, in the case of bending such a coaxial cable, for example, there is a possibility that the disk might be dislocated and moved. Since the distance between these disks is made as wide as possible within the range capable of supporting the outer conductor in stabilized manner, even a slight movement of the disks is undesirable. Moreover, since the outer conductor is being held in such a manner as described above, there is a possibility that the said outer conductor might be caused to cave-in due to the bending of the cable between disks, thus making it necessary to impose a limitation to the bending of the cable.

In the case of a cable having especially large diameter, there have been in use plastic bands which were fused around said disks for bridging so as to prevent the disks from buckling or being dislocated. However, it is difficult to make the process of fusing and bridging the plastic bands a continuous fabrication operation by a machine.

Also, there has been a spacer insulating type wherein a plastic spiral body and a plastic tube which is intimately cohering to said spiral body are provided by simultaneous extrusion on the inner conductor. As it is difficult to make a tube having a thin wall thickness by such an extrusion method, it becomes difficult, due to thick wall thickness, to make the effective dielectric constant of the cable as low as that of disk insulating type cable.

It becomes especially difficult in the case of the above disk insulating type to hold the outer conductor concentrically with respect to the inner conductor thereof due to the plastic bridging used therein.

It is an object of this invention to eliminate or greatly diminish such defects as described above in the fabrication of coaxial cables.

More specifically, it is an object of this invention to attain the desirable feature of coaxial cables, in the case of the above mentioned spacer insulating type, wherein a thin film of plastic tube is provided so as to intimately cohere to and completely cover the periphery of the spacer insulating body, upon which tube is provided the outer conductor (a longitudinal copper tape).

The nature and details of the invention, as well as the manner in which the foregoing object thereof may best be achieved, will now be described in detail, with reference to the accompanying drawings in which like parts are designated by like reference characters, and in which:

FIGS. 1, 2 and 3 are respectively cross sectional views of three kinds of the coaxial cables manufactured according to the method of the present invention;

FIGS. 4A, 4B and 4C are respectively partial perspective views of the coaxial cables as shown respectively in FIGS. 1, 2 and 3;

Figure 5:
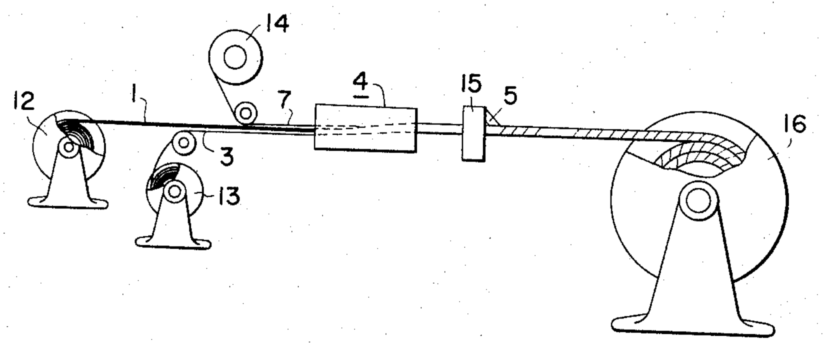
FIG. 5 is a schematic diagram showing a preferred embodiment of an apparatus embodying the method according to the present invention.

Referring to FIGS. 3 and 4C, an insulating separator made of a thin film tape 1 of plastic, for example, of polyethylene having on both side edges thereof fusion allowances 2 which are thinner than the tape main portion $1_a$ is caused to be fed longitudinally below an inner conductor 7 having a spacer insulating portion composed, for example, by inserting polyethylene disks 8 provided with a gap $8_a$, with a constant spacing therebetween, onto the conductor 7, a copper tape 3 having a width which is approximately the same as that of the said plastic thin film tape main portion $1_a$ is caused to be fed longitudinally below the said thin film tape 1, and the materials so assembled are fed into a heat forming device.

In the said device the above thin film tape of polyethylene is heated to nearly the melting state. Then the fusion allowances 2 at both side edges of the thin film tape 1 are directed outwardly with the tape main portion being butt contacted, so that the both fusion allowances 2 and 2 can be fused (or welded) together in a manner similar to brazing so as to form a polyethylene tube around the inner conductor 7. Simultaneously, the said metallic tape is made to be butt contacted longitudinally and to cover the thin film tape 1 in an intimately cohering manner.

Upon being discharged out of a heat forming device, the cable so formed is covered with a binding tape 5 and or shielding tapes $5_a$ over its periphery, whereby the fabrication of the coaxial cable of this invention is completed. In the coaxial cable of FIG. 3, the fused seam portion of the thin film tape 1 and the butt contact portion of the copper tape 3 are respectively represented by numerals 11 and 12, and the thickness of said fused seam portion is the same as that of the main portion $1_a$ of said tape 1.

When a polyethylene tape such as shown in FIG. 4A, comprising a main portion $1_a$ having projected knobs 9 and 10 and fusion allowances 2 at both side edges is used, the coaxial cable as shown in FIG. 1 is obtained, in which like members are designated by like reference characters.

Furthermore, in this invention, an insulating separator such as shown in FIG. 4B can be used as the thin film tape 1. This tape 1 consists of a thin outer polyethylene tape $2_a$ and a foamed polystyrene tape $1_a$ being the main portion of said tape 1, said tapes $2_a$ and $1_a$ being affixed as one body or being merely superimposed. When the tape assembly as shown in FIG. 4B is used as the insulating separator, the coaxial cable as shown in FIG. 2 is obtained, in which also like members are designated by like reference characters.

Figure 6:
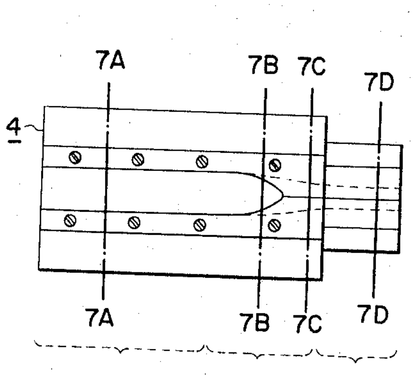
FIG. 6 is a plan view of a heat forming device to be used in the apparatus of FIG. 5.
Figures 7A, 7B, 7C, 7D:
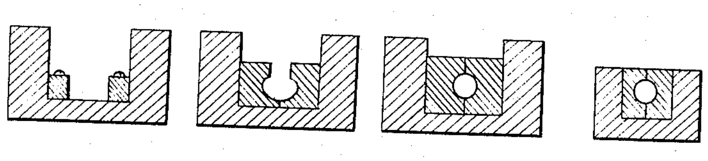
FIGS. 7A, 7B, 7C and 7D are respectively sectional views along the lines 7A—7A, 7B—7B, 7C—7C and 7D—7D of FIG. 6.

An apparatus and manner for fabricating the coaxial cable of the present invention is shown in FIG. 5. This apparatus comprises a spool 12 for the insulating thin film tape 1, a spool 13 for the copper tape 3, a spool 14 for the inner conductor (copper wire) 7, a heat forming device 4, a binding machine 15 for feeding and winding a binding tape 5 and/or shielding tape or tapes $5_a$ (steel tape), and a spool 16 for winding up the fabricated cable. The device 4 consists of a guide section, a forming section, a die section, and a heating member (not shown, but any conventional heating member can be used), for example an electric heating member for heating said sections, said guide, forming, and die sections corresponding respectively to the regions of 7A, 7B and 7C, and 7C of FIG. 6.

At the guide section, the fed copper tape 3 and thin film tape 1 are arranged in superimposed position and supplied into the forming section together with the inner conductor 7. The forming section has an inner wall having successively narrowing circular cross section, whereby the supplied members are formed so as to embrace the inner conductor 7. The die section has a hole of circular section, said hole being joined with the outlet opening of the forming section. Accordingly, during passing of the supplied members through said die section, said members are subjected to heating by the heating device and the plastic thin film is transformed to a tube shape while being butt jointed at the allowance portions of said film tape, and a metallic tube 3 is longitudinally butt jointed and covers, in an intimately cohesive manner, the said thin film tape 1, as described in connection with FIGS. 1 through 4.

On the tubular assembly extruded from the die section as described above is wound binding tapes and such as shielding tape or insulation tape by means of a binding machine, whereby a coaxial cable is completed.

In executing the present invention, when assuming that the inside diameter of the tube being formed of a plastic thin film tape 1 is $d$, the thickness of the main portion of the plastic thin tape is $t_1$, the width of the same is W, and the thickness of the metallic tape is $t_2$, the width of the tape man portion will be represented by $\pi(d+t_1)$. In this case, the width of the portion for fusion allowance 2 may be selected appropriately according to the value of $t_1$. While the width of the metallic tape has been described as being almost the same as the width of the tape main portion, in practice it is necessary that the width of the metallic tape should be larger by $\pi(t_1+t_2)$ than the width of the tape main portion in consideration of the thickness of the plastic tape main portion and the metallic tape, or otherwise the width of the metallic tape is made slightly wider than the plastic tape including the fusion allowances in consideration of the allowance in case of lamination. In practice, however, the said width may be the same as the width inclusive of that of the fusion allowance of the plastic tape, or slightly larger.

Previously, plastic tubes used in the fabrication of coaxial cables of the spacer insulating type (disk insulating type) have been manufactured by an extruding machine, with the result that it was difficult to produce tubes with thin walls and furthermore, it was impossible to provide a continuous covering on the inside surface of a long metallic tube. Moreover, there was further defect in that two process steps were required to provide a reinforcing body such as metallic tape or the like over the plastic tube. However, according to the method of this invention, since the plastic thin film tape used is such as has been described hereinbefore, that is, a thin fusion allowance is provided on both side edges thereof, said fusion allowance being extremely thinner than the tape main portion, only the fusion allowance alone will melt when the tape main portion is nearly in a melting state, thereby causing the fusion allowance to be fused in a manner similar to brazing because both sides of the tape main portion are butt jointed together.

Furthermore, as a metallic tape is supplied along the lower surface of the plastic thin film tape, within the heat forming device, the plastic tape conforms to the forming of the metallic tape, whereby without developing unnecessary deformation, it is formed in the desired form in a safe and reliable manner. Accordingly, intimate cohesion of the plastic thin tape with the spacer insulating body as well as with the metallic tape can be obtained. Since the fusion allowances are extremely thin, the longitudinal butt fusing portion of the plastic thin film tape can be easily made to be the same thickness as that of the tape main portion.

Next, since the coaxial cable of this invention is composed so that a tube made of plastic thin film tape is intimately cohering with the spacer insulating body over the inner conductor thereof, there is no possibility, even in the case of a disk insulating type, of movement of the disk due to the bending of the cable, rendering the holding of the outer conductor unstable. This also serves as a means of reinforcing the disk against buckling deformation thereof.

Moreover, as the tube of plastic thin film tape is intimately cohering with the outer conductor, it is possible to prevent deformation of the outer conductor from occurring. Also, since the longitudinal fusing portion of the plastic thin film tape is not thicker than the tape main portion, it is possible to place the outer conductor thereon in a position concentric with the inner conductor. It is also possible to maintain the same in the said position. Actual examples of the coaxial cable according to this invention will be described hereinbelow.

(1) In the case of embodiment of FIG. 1:

| | | |
|---|---|---|
| Inner conductor **7** | mm. in diameter | 1.18 |
| Outer conductor **3** | do | 4.8 |
| Thickness of its tape | mm | 0.18 |
| Width of its tape | mm | 14.8 |
| Insulating separator (FIG. 4A) **1** (thin film tape): | | |
| Material | | Polyethylene |
| Width of its tape W | mm | 14.5 |
| Thickness of its tape main portion $t_1$ | mm | 0.4 |
| Width of its tape main portion $\pi(d+t_1)$ | mm | 12.3 |
| Thickness of the fusion allowance **2** | mm | 0.15 |

(2) In the case of embodiment of FIG. 2:

| | | |
|---|---|---|
| Inner conductor **7** | mm. in diameter | 1.18 |
| Outer conductor **3** | do | 4.8 |
| Thickness of its tape | mm | 0.18 |
| Width of its tape | mm | 14.8 |
| Insulating separator (FIG. 4B) **1**: | | |
| Material— | | |
| Main body | | Foamed polystyrene |
| Outer body | | Polyethylene |
| Width of the outer body tape W | mm | 14.5 |
| Thickness of the main body tape $t$ | mm | 1.00 |
| Width of the main body tape $\pi(d+t_1)$ | mm | 10.00 |
| Thickness of the outer body tape $2a$ | mm | 0.30 |

*Note.*—In the above Examples 1 and 2, feeding velocity is 3 m./min. and heating temperature of the heat forming device 4 is about 200° C.–180° C.

As described above, the present invention is particularly suitable and useful for application to a coaxial cable of spacer insulating type and the fabricating method therefor.

Although this invention has been described with respect to a few embodiments thereof, it is not limited thereto and other changes and modifications may be made within the nature and scope of the invention, as defined by the appended claims.

What is claimed is:

1. A method of fabricating coaxial cables which comprises: causing an inner conductor core to travel in a line; feeding a plastic film tape to travel concurrently at the same speed with and in contact with the said inner conductor on one side thereof, the said tape being provided along its two longitudinal side edges with fusion allowance material which are thinner than the main part of the said tape, and which are so designed that, after mutual fusion, the fused seam part will be of approximately the same thickness as the main part of the said tape; feeding a metal tape to travel concurrently at the same speed and in contact with the said plastic film tape on its side opposite that contacting the said inner conductor core; feeding the resulting assembly of the said core, plastic film tape, and metal tape, into a heat forming device to form said plastic tape into a plastic tube intimately about said core and butt joining the longitudinal side edges while heating said fusion allowance material during passage of said assembly through said heat forming device to cause fusion bonding and to form the metal tape into a longitudinal butt seamed tube intimately about the plastic tube; and, winding retaining binding tapes around the coaxial cable so formed upon exit from the heat forming device.

2. A method of fabricating a coaxial cable according to claim 1, in which in the winding process for retaining binding tapes, a shielding tape or tapes are wound together with an insulation tape.

3. A method of making a coaxial cable comprising the steps of: causing an inner conductor core to travel in a line; feeding a plastic film tape so as to travel concurrently at the same speed with and in contact with said inner conductor core on one side thereof, the tape being provided along its longitudinal side edges with fusing material thinner than the main part of the tape, so designed that, after fusing the material from each edge, the fused seam will be of approximately the same thickness as the main part of the tape; feeding a metal tape to travel concurrently at the same speed and in contact with the plastic film tape on the side opposite that contacting said inner conductor core; feeding and passing the resulting assembly of said conductor core, plastic film tape, and metal tape, into and through a heat forming device to form said plastic film tape into a plastic tube intimately about said conductor core and butt joining the side edges, melting the fusion allowance material, during passage of said assembly through said heat forming device, to form longitudinal butt seams between the two longitudinal side edges of the plastic film tape and the edges of the metal tape; and winding retaining binding tapes around the coaxial cable formed, upon exit from said heat forming device.

4. A method according to claim 3, in which a shielding tape or tapes are wound around the coaxial cable together with an insulation tape.

5. A method according to claim 3, in which a spacer insulation is formed by knobs provided on the plastic thin film tape.

6. A method according to claim 3, in which a spacer insulation is formed by plastic disks provided around the inner conductor and a plastic thin film tape provided around said disks.

7. A method according to claim 3, in which a spacer insulation is formed by a foamed polystyrene tape and a polyethylene extremely thin film tape.

References Cited

UNITED STATES PATENTS

| | | | |
|---|---|---|---|
| 1,757,030 | 5/1930 | Watson et al. | 156—55 |
| 2,060,162 | 11/1936 | Boe | 174—28 |
| 2,167,538 | 7/1939 | Turk et al. | 174—28 |
| 2,210,400 | 8/1940 | Fischer et al. | 174—28 |
| 2,453,313 | 11/1948 | Gordon | 156—55 |
| 2,803,730 | 8/1957 | Kinghorn | 156—54 X |
| 3,121,136 | 2/1964 | Mildner | 174—28 |

EARL M. BERGERT, *Primary Examiner.*

JOHN F. BURNS, D. A. KETTLESTRINGS, T. R. SAVOIE, *Examiners.*

UNITED STATES PATENT OFFICE

CERTIFICATE OF CORRECTION

Patent No 3,341,385 September 12, 1967

Akira Nago

It is hereby certified that error appears in the above numbered patent requiring correction and that the said Letters Patent should read as corrected below.

In the heading to the printed specification, line 4, for "Tujikura Densen Kabushiki Kaisha" read -- Fujikura Densen Kabushiki Kaisha --.

Signed and sealed this 8th day of October 1968.

(SEAL)
Attest:

Edward M. Fletcher, Jr.
Attesting Officer

EDWARD J. BRENNER
Commissioner of Patents